May 6, 1969  S. H. SCHWARTZ  3,442,483
FLUID FLOW CONTROL VALVE
Filed Dec. 22, 1966  Sheet 2 of 3
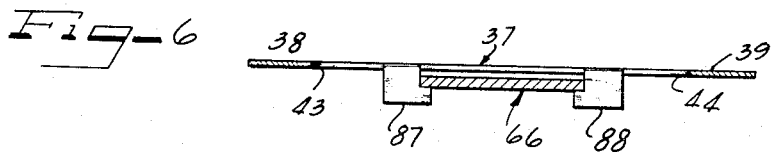
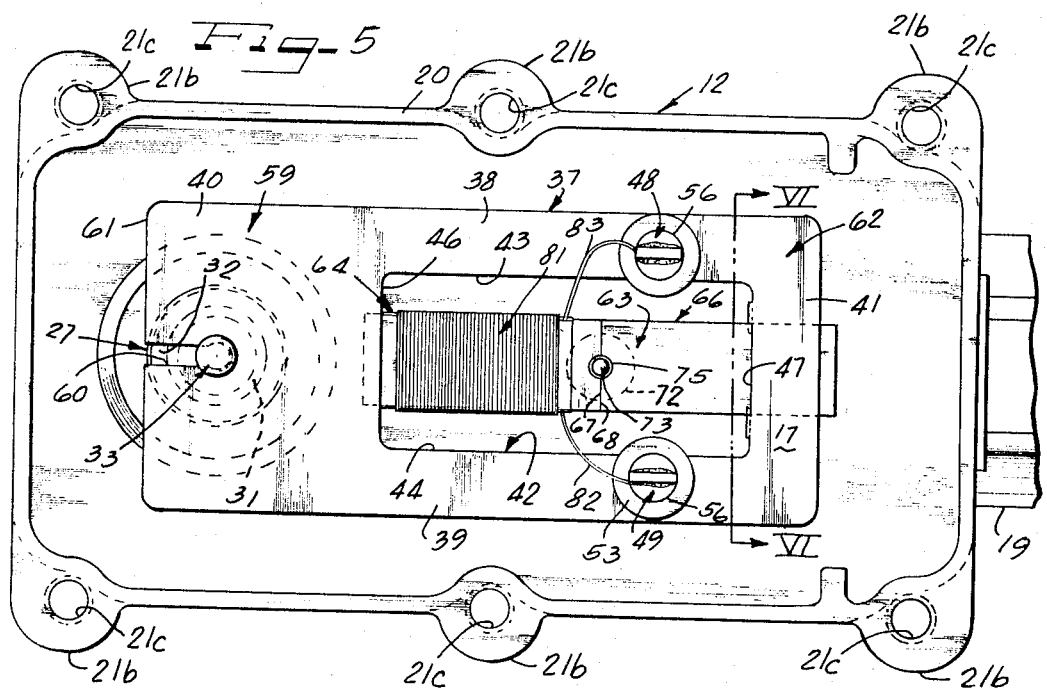
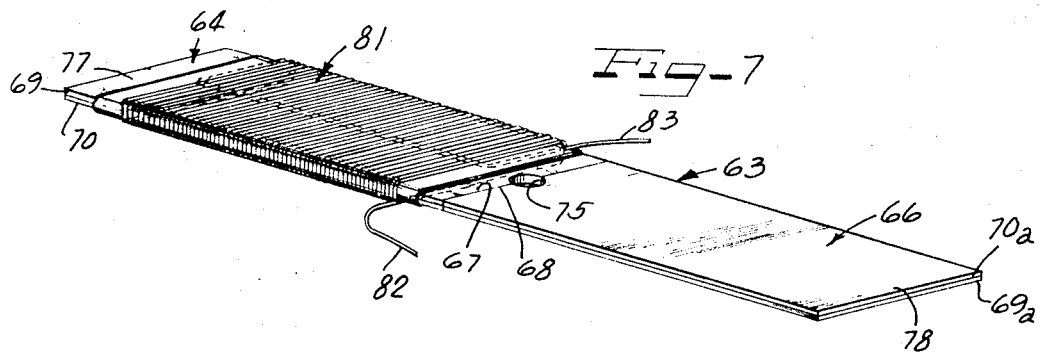
INVENTOR.
SAMUEL H. SCHWARTZ
BY Hill, Sherman, Meroni, Gross & Simpson
ATTORNEYS May 6, 1969     S. H. SCHWARTZ     3,442,483
FLUID FLOW CONTROL VALVE
Filed Dec. 22, 1966     Sheet 3 of 3
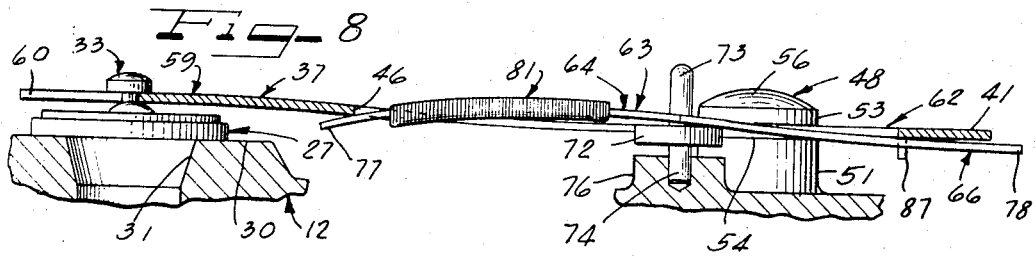
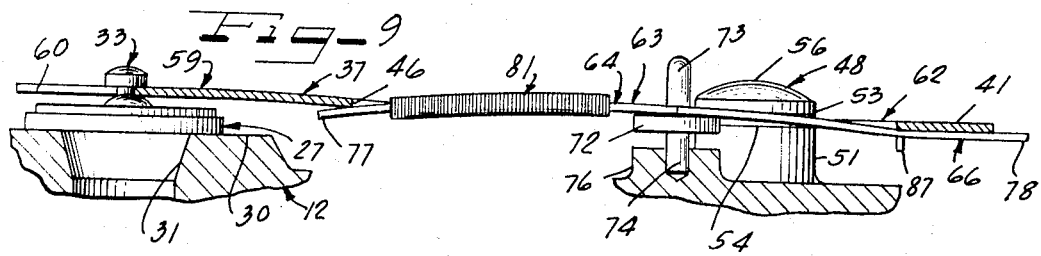
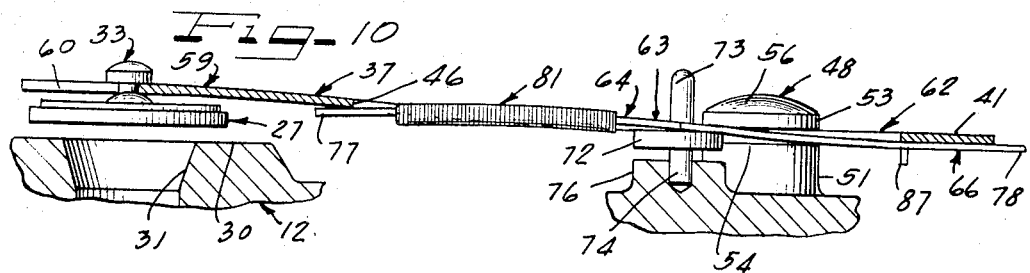
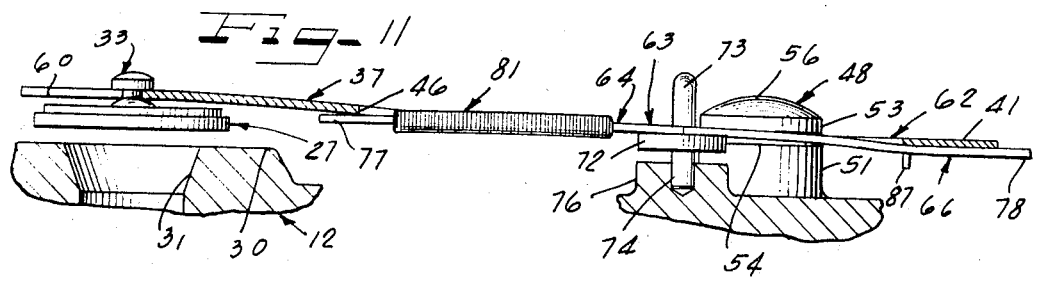
INVENTOR.
SAMUEL H. SCHWARTZ
BY Hill, Sherman, Meroni, Gross & Simpson
ATTORNEYS

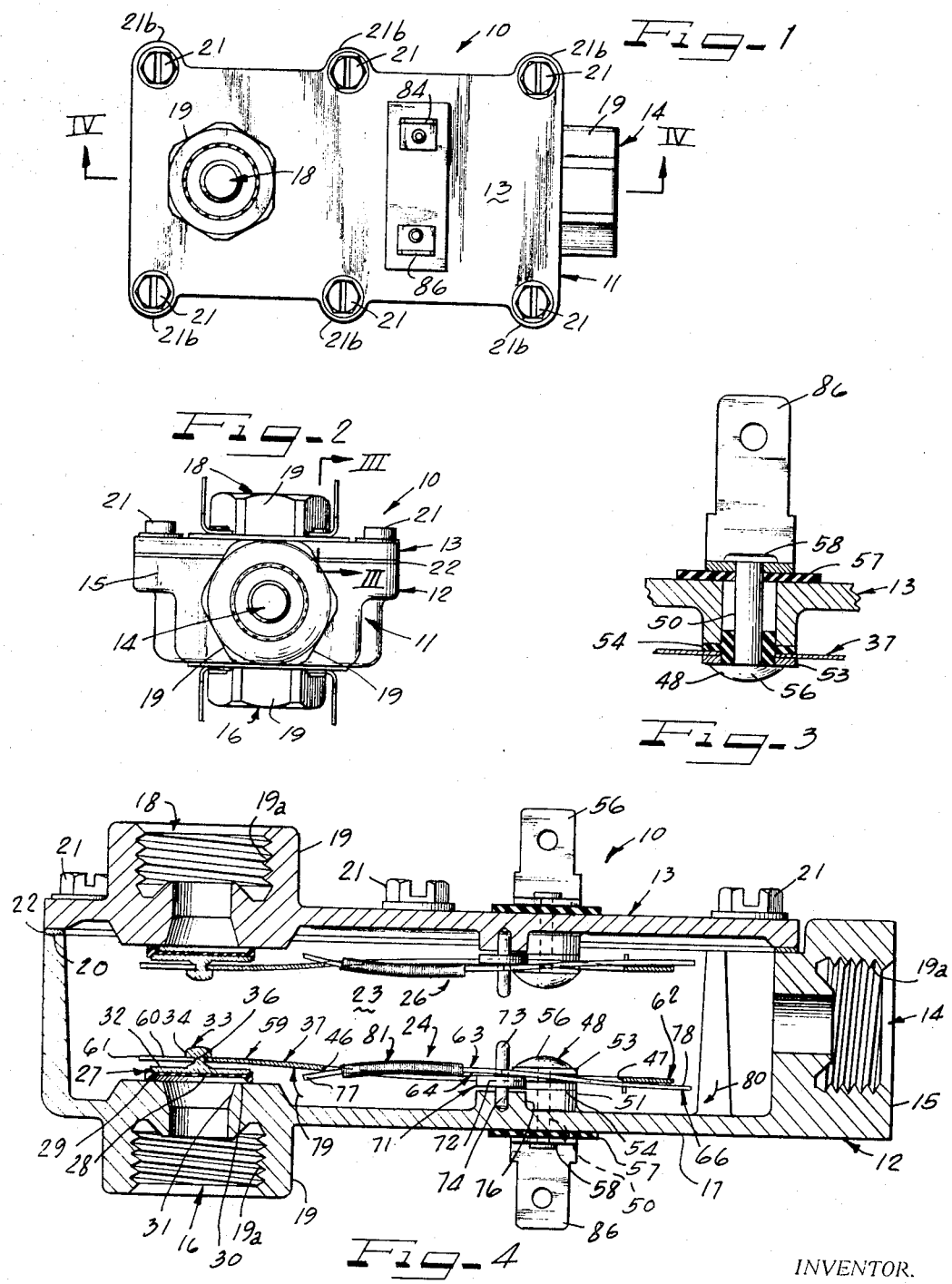

United States Patent Office 3,442,483
Patented May 6, 1969

3,442,483
FLUID FLOW CONTROL VALVE
Samuel H. Schwartz, Deerfield, Ill., assignor to The Dole Valve Company, Morton Grove, Ill., a corporation of Illinois
Filed Dec. 22, 1966, Ser. No. 603,984
Int. Cl. F16k *31/02, 1/32*
U.S. Cl. 251—11            13 Claims

ABSTRACT OF THE DISCLOSURE

A fluid flow control valve having a valve member movable between open and closed positions in response to the energization of an electric heater mounted on a flexible member comprising a pair of flexible bi-metal elements situated in the flow path of the fluid and subjected to the temperature of the fluid. The heater is so arranged on the flexible arm so as to heat only one of the bi-metal elements, and the high and low expansion sides of the two bi-metal elements are in mutually inverted relation whereby only the energization and deenergization of the heater effectuates movement of the valve member, and not variations in the temperature of the fluid.

Background of the invention

This in relates generally to fluid flow control valves, and more particularly to a flow control valve having a valve member movable between open and closed positions to control the flow of fluid through an associated valve port. Movement of the valve member is accomplished through the utilization of a temperature responsive device situated within the control valve.

In applications of valves of such general description wherein the desired flow of fluid through the valve is not a function of the temperature of the fluid, means may be provided for controlling the temperature of the temperature responsive means independently of the temperature of the fluid. In addition, means may be provided to compensate for variations in the temperature of the fluid, since such variations could adversely affect the reliability of control of the valve.

Known compensating flow control valves are relatively expensive in manufacture and thus prohibitive for use in many applications. By contrast, the present invention provides a fluid temperature compensating control valve that is inexpensive in manufacture yet ensures reliable control of the valve member across a wide range of temperature variations in the fluid.

In accordance with the principles of the present invention, the valve member associated with the valve port is operatively connected to a bi-metal element situated within the flow path of the fluid within the valve body. The coils of an electric resistance heater are wrapped around the bi-metal element. Energization of the heater causes the elements to warp and move the valve member away from the valve port, thereby opening the port.

In order to compensate for variations in the temperature of the fluid another bi-metal elements is connected to the first element but the high and low expansion sides of the second element are inverted with respect to the high and low expansion sides of the first element. The two bi-metal elements are arranged so that changes in the temperature of fluid, which similarly affects the temperatures of both elements, warps one element in one direction and the other element in an opposite direction, the total change in the configuration of the two elements having no effect on the disposition of the valve member. However, when the heater raises the temperature of its associated bi-metal element independently of the temperature of the other element, movement of the valve member results.

The two bi-metal elements are joined together in end-to-end relation. Instead of directly engaging the valve member the joined-together elements overlie the end portions of a valve member actuator arm which extends in substantially parallel relation to the elements. One end portion of the actuator arm is rigid, whereas the other end portion is flexible and mounts the valve member. A fulcrum bows the middle portion of the joined-together elements to bias the flexible end portion of the actuator arm in one direction against an opposite inherent bias of the flexible end portion. A change in temperature of the fluid changes the overall configuration of the two bi-metal elements but does not effectively change the magnitude of the bias of the elements against the flexible end portion of the actuator arm and therefore does not affect movement of the valve member.

Upon the energization of the heater which is mounted on one of the bi-metal elements, the overall configuration of the two elements changes, thereby changing the biasing force applied thereby to the flexible end portion of the actuator arm an amount sufficient to effect movement of the valve member.

From the foregoing, it will be appreciated that a fluid temperature compensating control valve embodying the present invention may be utilized in many applications, is relatively inexpensive in manufacture, is reliable in operation and will serve a long, useful life.

It is, therefore, a general object of the present invention to provide an improved fluid temperature compensating flow control valve.

A more specific object of the invention is to control the movement of the valve member as a function of the temperature differential between two bi-metal elements, both of which are situated within and subject to the temperature within the fluid flow path of the valve.

Another object is to reduce costs in manufacture and to increase reliability in operation by joining the two bi-metal elements in coplanar end-to-end relation and by arranging the elements to exert a bias in one direction against a flexible valve-member-carrying actuator arm inherently biased in an opposite direction.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

Brief description of the drawings

FIGURE 1 is a top plan view of a fluid temperature compensating flow control valve constructed in accordance with the principles of the present invention.

FIGURE 2 is an elevational end view of the valve shown in FIGURE 1.

FIGURE 3 is an enlarged fragmentary vertical cross-sectional view taken along lines III—III of FIGURE 2.

FIGURE 4 is a vertical cross-sectional view taken along lines IV—IV of FIGURE 1.

FIGURE 5 is an enlarged top plan view, similar to FIGURE 1, but illustrating the control valve with the top cover thereof removed.

FIGURE 6 is a sectional view taken along lines VI—VI of FIGURE 5.

FIGURE 7 is an enlarged perspective view of the two bi-metal elements joined together in end-to-end relation with the coils of an electric resistance heater wound around one of the bi-metal elements.

FIGURES 8–11 are fragmentary sectional views similar to FIGURE 4 and showing the relative disposition of parts of the valve member assembly under varying temperatures of the fluid and under energized and deenergized conditions of the electric heater.

*Description of the preferred embodiment*

Referring to the drawings, a fluid temperature compensating flow control valve constructed in accordance with the principles of the present invention is indicated generally at reference numeral 10. The valve 10 comprises a valve body 11 having a lower portion or casing 12 and a casing cover 13.

Although the principles of this invention are applicable to any fluid flow control valve, one particularly useful application is made to control the flow of gas and the illustrated embodiment comprises a dual-outlet gas valve having a gas inlet 14 formed in an end wall 15 of the casing 12 and a gas outlet 16 formed in a bottom wall 17 of the casing 12. Another gas outlet 18 is formed in the cover 13 in oppositely disposed relation to the outlet 16. The inlet 14 and the outlets 16 and 18 extend respectively through suitable pipe or conduit connectors 19 which may be internally threaded as indicated at 19a.

The cover 13 is mounted on a top wall 20 of the casing 12 by means of a plurality of suitable fasteners such as threaded bolts indicated at 21 which extend through threaded bores 21c formed in complementarily shaped mounting flanges 21b provided on the casing 12 and on the cover 13. A gasket 22 may be interposed between the casing 12 and the cover 13 to provide an air tight seal therebetween.

The interior of the casing 12 is hollow as indicated at 23 and situated therein are a pair of valve assemblies 24 and 26 for controlling the flow of gas through the outlets 16 and 18 respectively. Since the two assemblies are identical to one another only valve assembly 24 will be described in detail herein, but similar reference numerals are applicable to the various components of valve assembly 26.

Valve assembly 24 comprises a movable poppet valve member 27 which includes a resilient disk 28 circumferentially beaded as at 29. The bead of the disk is abuttingly engageable with a valve seat 30 in surrounding relation to a palve port 31 which communicates with the gas outlet 16.

The disk 28 is secured to a rigid back-up plate 32 from which projects a rivet-like member 33 comprising an enlarged head 34 and a reduced diameter shank 36.

The valve assembly 24 further comprises a generally rectangularly shaped valve member actuator arm 37 having a pair of spaced parallel longitudinal legs 38 and 39 and a pair of spaced transverse legs 40 and 41. Within the legs 38–41 is a recess 42 bounded by a pair of side walls 43 and 44 and a pair of end walls 46 and 47.

The actuator arm 37 is mounted within the hollow interior 23 of the casing 12 (and thus in the path of flow of the gas passing therethrough) by means of a pair of rivets 48 and 49, shank portions 50 of which extend through bores formed in the longitudinal legs 38 and 39 of the actuator arm, a pair of embossments 51 projecting inwardly from a bottom wall 52 of the casing 12 (or from the inner wall of the cover 13) and through the bottom wall 52 itself. A pair of insulator washers 53 and 54 are interposed respectively between the longitudinal legs 38 and 39 and enlarged heads 56 of the rivets 48 and 49 as well as between the longitudinal legs 38 and 39 and the embossments 51. Another insulator washer 57 is interposed between the wall 52 of the casing 12 (or the cover 13) and flared ends 58 of the rivets 48 and 49.

The actuator arm 37 is constructed from a sheet of flexible metal such as spring steel. One end portion 59 of the actuator arm 37, which comprises the transverse leg 40 and those portions of the longitudinal legs 38 and 39 which extend to the left of rivets 48 and 49 as viewed in FIGURES 4 and 5, is flexible and able to bend or pivot about a line which extends between the rivets 48 and 49. A slot 60 opens to an end wall 61 of the end portion 59 and receives the shank of the valve member rivet 33. Thus the valve member 27 is moved in unison with and opens or closes the outlet port 31 depending upon the position of the flexible end portion 59 of the actuator arm 37.

An opposite end portion 62 of the actuator arm 37 which comprises the transverse leg 41 and those portions of the longitudinal legs 48 and 49 which extend to the right of rivets 48 and 49 is much shorter than end portion 59 and is substantially rigid or immovable. Thus, as shown in FIGURE 4, the end portion 62 extends at right angles to the shanks 50 of the rivets 48 and 49 and in parallel relation to the wall 52 of the valve casing 12 as well as to the cover 13. The flexible end portion 59, however, is bent slightly away from its respective outlet port 31 and imparts a continuous closing bias to its respective valve member 27.

Movement of the actuator arm 37 and its valve member 27 is governed by a thin elongated flexible member 63 which extends in generally parallel relation to the actuator arm 37. The member 63 comprises a pair of bi-metal elements 64 and 66 which extend in mutually coplanar relation and which are joined together by a suitable weld connection or the like in end-to-end relation at adjacent edges 67 and 68 thereof.

The high and low expansion sides of the bi-metal elements 64 and 66 are reversed. For example, the high expansion side of the element 64 is indicated at 69 and the low expansion side at reference numeral 70. The high expansion side of element 66 is indicated at 69a and the low expansion side at 70a. Thus when the two bi-metal elements 64 and 66 are both heated to a given temperature they will warp or bend respectively in mutually opposite directions.

The member 63 is mounted in a curved condition within the casing 12 on a fulcrum member 71 which comprises an annular disk 72 and a pair of axially aligned cylindrical studs 73 and 74. The stud 74 is received in a bore formed in an embossment 76 and the stud 73 extends through a central aperture 75 formed in the flexible member 63 at the engaging edges of the bi-metal elements 64 and 66.

When assembled in place a distal end 77 of the bi-metal element 64 protrudes beyond the inner recess wall 46 of and under the end portion 59 of the actuator arm 37. Similarly a distal end 78 of the bi-metal element 66 extends beyond the inner recess wall 47 and under the end portion 62 of the actuator arm 37. The central portion of the flexible member 63 is bowed outwardly by the disk 72 of the fulcrum member 76 to reside on a side of the longitudinal axis of the actuator arm 37 opposite the side at which the distal ends 77 and 78 reside.

At about an average fluid or gas temperature the overall configuration of the flexible member 63 is as shown in FIGURE 4. However, if the temperature of both of the bi-metal elements 64 and 66 is increased to the same degree, a condition which obtains when the temperature of the gas within the valve 10 increases for any reason, the distal ends of the bi-metal elements will tend to move in the directions indicated by the arrows 79 and 80 as shown in FIGURE 4.

It is noted that the distal end 78 of the bi-metal element 66 merely tends to move in the direction of arrow 80 upon an increase in the temperature thereof. Actually, the distal end 78 is not able to move at all, being securely held to the rigid end portion 62 of the actuator arm 37 by a pair of inturned flanges 87 and 88, and it is the opposite end of the element 66 adjacent the abutting edge 68 thereof which actually moves in response to an increase in temperature and warpage of element 66.

In order to raise the temperature of the bi-metal element 64 independently of the temperature of the bi-metal element 66, the coils of an electric resistance heater 81 are wound around the bi-metal element 64. The two ends of the coils of the heater 81 are indicated at 82 and 83 and are soldered or otherwise electrically connected to the heads 56 of rivets 48 and 49, respectively. A pair of electric contacts 84 and 86 are secured to the flared ends 58 of the rivets in order to energize the heater 81.

In operation, the actuator arm 37 normally biases the valve member 27 to a closed position whereby the resilient disk 28 is seated on the valve seat 30 to close the outlet port 31. Even if the temperature of the gas surrounding or flowing past both of the bi-metal elements 64 and 66 increases or decreases the valve member 27 will not open the port 31. In such circumstance the closed position of the valve member 27 obtains even though the distal end 77 of the bi-metal element 64 tends to move upwardly in the clockwise direction indicated by the arrow 79 and against the flexible end portion 59 of the actuator arm 37, since the distal end 78 of the bi-metal element 66 tends to move in a counterclockwise direction as indicated by the arrow 80. The change in configuration or curvature of the bi-metal element 66 is sufficient to offset the effect of the changed configuration of the bi-metal element 64 to negate movement of the actuator arm 37 and thus the valve member 27.

The operation of the valve 10 can best be understood by referring to FIGURES 8–11 which illustrate the configurations and relative disposition of the various parts of the valve assembly 24 under different conditions of gas temperature when the heater is both energized and de-energized.

For example, FIGURE 8 shows the curvature of the flexible member 63 when the temperature of the gas within the valve 10 is at an average condition and the heater 81 of valve assembly 24 is energized. This condition may of course prevail when the valve members 27 of both valve assemblies 24 and 26 are in a closed position, or when only the valve member of valve assembly 24 is closed, the other valve member being open to deliver gas through the outlet 18. It will be appreciated that the temperature of the gas within the valve 10 may depend upon whether both of the valve assemblies 24 and 26 are closed, precluding any flow of gas through the valve, or one or both of the valve assemblies are open, resulting in a flow of gas through the valve. In the condition of the valve 10 shown in FIGURE 8 the configuration of the two bi-metal elements 64 and 66 is such that the distal end 77 of bi-metal element 64 does not exert a sufficient force against the flexible end portion 59 of the actuator arm 37 to raise the valve member 27 from the valve seat 31.

The curvature of the flexible member 63 shown in FIGURE 9 obtains when the temperature of the gas in the valve 10 has increased above the temperature which corresponds to FIGURE 8. As a result of the increased temperature bi-metal element 64 is less curved than it is in FIGURE 8, and the distal end 77 thereof tends to raise the flexible end portion 59 of the actuator arm 37 and thus the valve member 27.

At the same time, however, the bi-metal element 66 also changes curvature whereby the inner portion thereof adjacent the inner edge 68 bends downwardly toward the disc 72 of the fulcrum member 71, thereby moving the inner edge 67 of the bi-metal element 64 with it. As a result, although the bi-metal element 64 has straightened somewhat, the distal end 77 has not moved and the valve member 27 is still in a closed position.

FIGURE 10 illustrates the curvature of the flexible member 63 when the temperature of the gas within the valve 10 is the same as the gas temperature which corresponds to FIGURE 8, but with the heater 81 energized.

The configuration of bi-metal element 64 is less curved than it is in FIGURE 8 because of the rise in temperature due to the energization of the heater 81. The configuration of bi-metal element 66 is substantially the same as it is in FIGURE 8, however, since it is subjected to the same gas temperature as corresponds to FIGURE 8 and is substantially unaffected by energization of the heater 81.

In combination with the FIGURE 8 configuration of bi-metal element 66, the straightened configuration of the bi-metal element 64 effects upward movement of the flexible end portion 59 of the actuator arm 37, and thus raises and opens the valve member 27.

FIGURE 11 illustrates the relative configurations and disposition of parts when the temperature of the gas flowing through the valve 10 corresponds to the increased temperature of FIGURE 9, and the heater 81 is energized. The inner portion of bi-metal element 66 has flattened out along the top of the fulcrum disc 71 which has the effect of dropping the outer end portion of the bi-metal element 64 to close valve member 27. However, due to the increased gas temperature the outer end of bi-metal element 64 tends to curve upwardly in the same degree and to the same extent as the inner portion of bi-metal element 66 curves downwardly. Thus the distal end 77 of bi-metal element 64 is situated in the same position as obtains in FIGURE 10. The valve member is maintained in an open position.

It should be understood that the illustrated embodiment is merely exemplary of a valve structure constructed in accordance with the principle of this invention. The relative lengths of the bi-metal elements 64 and 66 may be varied so that the energization and de-energization of the heater 81 on element 64 has more or less effect on the opening and closing of the valve member 27. The material used for the high and low expansion sides of the bi-metal elements can also be varied, as will be understood by those skilled in the art. The range of temperatures of the gas or other fluid controlled by the valve should also be considered for any given application of the valve.

An important economy inherent in the present invention, however, resides in the fact that both of the bi-metal elements 64 and 66 can be identical and merely inverted with respect to the high and low expansion sides thereof. The end-to-end relation of the two bi-metal elements and the provision of the fulcrum member at the adjoining edges thereof also serve as important features in the economy in fabrication and assembly of the valve.

It will be appreciated that the principles of the present invention are applicable to a valve having only a single outlet. In the dual-outlet arrangement illustrated in the drawings the heater 81 of one of the valve assemblies 24 and 26 can be energized to open its respective valve member 27 while the heater of the other valve assembly can be de-energized to close its respective valve member.

I claim as my invention:

1. An ambient temperature compensating fluid flow control valve comprising, a valve body having an inlet, an outlet and a fluid flow path between said inlet and said outlet, a valve port in said flow path, a valve assembly controlling fluid flow through said port comprising, a valve member movable between an open and a closed position for opening and closing said port, a valve actuator arm secured to said valve body and having a rigid end portion and a flexible end portion, said valve member being secured to said flexible end portion of said actuator arm and biased thereby toward one of said positions thereof, and a flexible elongated member comprising, a pair of bi-metal elements situated within said flow path and joined in end-to-end relation with the high and low expansion sides of said pair of elements being in mutually inverted relation, the ends of said elongated member overlying respectively said end portions of said actuator arm on one side of the longitudinal axis of said actuator arm, a fulcrum member bowing the center portion of said elongated member to the other side of the longitudinal axis of said actuator arm, and heater means for heating one of said bi-metal elements independently of the other.

2. The control valve as defined in claim 1 wherein said fulcrum member and said elongated member have formed thereon cooperating pin and pin receiving means for positioning said elongated member relative to said actuator arm.

3. The control valve as defined in claim 1 wherein said heater means is mounted on the end of said elongated member overlying said flexible end portion of said actuator arm.

4. The control valve as defined in claim 3 wherein said actuator arm biases said valve member to said closed position thereof and actuation of said heater means urges said valve member from said closed position to said open position thereof.

5. The control valve as defined in claim 1 wherein said valve member is disposed on said one side of the longitudinal axis of said actuator arm.

6. The control valve as defined in claim 1 wherein said bi-metal elements are arranged so that changes in temperature in said flow path ambient both of said bi-metal elements have no substantial effect on the movement of said valve member.

7. The control valve as defined in claim 1 wherein said heater means comprises an electrical resistance heater and including, means securing said valve actuator arm to said valve body and comprising a pair of electrical contacts for receiving the conductor wires of said electrical resistance heater.

8. The control valve as defined in claim 1 wherein said pair of bi-metal elements extend in a substantially planar configuration and in generally parallel relation with said actuator arm.

9. The control valve as defined in claim 1 wherein said valve member comprises a poppet valve and said actuator arm is adapted to move said poppet valve toward and away from said port.

10. In a fluid flow control valve having a valve body, a port and a movable valve member for opening and closing the port, the improvement of a valve actuator assembly comprising, a flexible member for opening and closing said valve member comprising a pair of bi-metal elements in the flow path of the fluid within the valve body, heating means in association with one of said bi-metal elements to heat said one bi-metal element independently of the other, the high and low expansion sides of said bi-metal elements being arranged so that one configuration of said bi-metal elements obtains to open said valve member when the temperature of said one bi-metal element is greater than that of the other bi-metal element, and another configuration of said bi-metal elements obtains to close said valve member when the temperature of said one bi-metal element is the same as that of the other bi-metal element, and a fulcrum for supporting said elements substantially at the adjoining edges thereof, said bi-metal elements extending in opposite directions equal distances from said fulcrum.

11. A fluid flow control valve comprising, a valve body having an inlet, and outlet, means forming a fluid flow path between said inlet and said outlet and a valve port in said path, a valve member associated with said port and movable between open and closed positions to control the flow of fluid through said port, a movable valve actuator arm mounted on said valve body and normally biasing said valve member to one of said positions, a pair of temperature responsive means located in the flow path of the fluid and operatively connected to said actuator arm, one of said temperature responsive means adapted to urge said actuator arm in a manner to open said valve member upon an increase in the temperature thereof, and to close said valve member upon a decrease in the temperature thereof, the other of said temperature responsive means adapted to urge said valve actuator arm in a manner to close said valve member upon an increase in the temperature thereof, and to open said valve member upon a decrease in the temperature thereof, and independent heating means associated with one of said temperature responsive means for varying the temperature of its associated temperature responsive means indenpendently of the temperature of the other temperature responsive means.

12. The control valve as defined in claim 11 wherein said pair of temperature responsive means comprises a pair of bi-metal elements, the high and low expansion sides of said bi-metal elements being inverted with respect to each other.

13. The control valve as defined in claim 11 wherein said bi-metal elements are arranged in coplanar end-to-end joined relation.

References Cited

UNITED STATES PATENTS

| 2,743,574 | 5/1956 | McCorkle | 251—11 |
| 2,762,387 | 9/1956 | Orwin | 137—608 X |
| 3,229,956 | 1/1966 | White | 251—11 |
| 3,275,285 | 9/1966 | Morris | 251—11 |

FOREIGN PATENTS 1,156,616  10/1963  Germany.

ARNOLD ROSENTHAL, *Primary Examiner.*

U.S. Cl. X.R.

137—608; 236—68